(12) United States Patent
Venkiteswaran et al.

(10) Patent No.: US 10,778,559 B2
(45) Date of Patent: Sep. 15, 2020

(54) FACILITATING SIMULATION OF NETWORK CONDITIONS IN A HYBRID APPLICATION ENVIRONMENT

(71) Applicant: salesforce.com, inc., San Francisco, CA (US)

(72) Inventors: Kevin Venkiteswaran, Alameda, CA (US); Jinal Kathiara, Walnut Creek, CA (US)

(73) Assignee: salesforce.com, inc., San Francisco, CA (US)

( * ) Notice: Subject to any disclaimer, the term of this patent is extended or adjusted under 35 U.S.C. 154(b) by 476 days.

(21) Appl. No.: 15/592,984

(22) Filed: May 11, 2017

(65) Prior Publication Data

US 2018/0109434 A1    Apr. 19, 2018

Related U.S. Application Data

(60) Provisional application No. 62/409,239, filed on Oct. 17, 2016.

(51) Int. Cl.
| | |
|---|---|
| *H04L 12/26* | (2006.01) |
| *G06F 9/54* | (2006.01) |
| *H04L 12/24* | (2006.01) |
| *H04L 29/08* | (2006.01) |

(52) U.S. Cl.
CPC .............. *H04L 43/50* (2013.01); *G06F 9/547* (2013.01); *H04L 41/145* (2013.01); *H04L 67/02* (2013.01); *H04L 67/10* (2013.01)

(58) Field of Classification Search
CPC .... G06F 17/5009; G06F 9/547; G06F 11/362; G06F 11/3664; G06F 11/3688; H04L 41/145; H04L 43/50; H04L 67/02; H04L 67/10; H04W 40/38
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

U.S. Appl. No. 15/244,524, filed Aug. 23, 2016, Venkiteswaran, et al.

(Continued)

*Primary Examiner* — Todd L Barker
(74) *Attorney, Agent, or Firm* — Weaver Austin Villeneuve & Sampson LLP

(57) ABSTRACT

Disclosed are some implementations of systems, apparatus, methods and computer program products for facilitating the simulation of a variety of network conditions for the testing of network-connected applications in a hybrid application environment. A test system in communication with a web browser intercepts and overrides a network communication to the application and then substitutes an altered or degraded communication.

18 Claims, 9 Drawing Sheets

(56) References Cited

U.S. PATENT DOCUMENTS

| | | |
|---|---|---|
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,047,404 B1* | 6/2015 | Jibaly .................. G06F 11/362 |
| 9,078,123 B1* | 7/2015 | Benco .................. H04W 4/029 |
| 9,646,325 B2* | 5/2017 | DeWitt .................. H04W 4/12 |
| 10,409,816 B2 | 9/2019 | Venkiteswaran et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |

(56) References Cited

U.S. PATENT DOCUMENTS

| | | |
|---|---|---|
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0281107 A1* | 11/2010 | Fallows ............... G06F 9/54 709/203 |
| 2011/0218958 A1 | 9/2011 | Warshaysky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2012/0294173 A1* | 11/2012 | Su ................... H04W 24/10 370/252 |
| 2013/0046878 A1* | 2/2013 | Fryc ............... G06F 11/3672 709/224 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0246944 A1* | 9/2013 | Pandiyan ............. G06F 9/54 715/760 |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0135198 A1 | 5/2015 | Pack, III et al. |
| 2015/0142596 A1 | 5/2015 | Jakobson et al. |
| 2015/0172563 A1 | 6/2015 | Jakobson et al. |
| 2016/0162389 A1* | 6/2016 | Lachwani ........ H04L 43/0817 714/38.14 |
| 2018/0124027 A1 | 5/2018 | Venkiteswaran et al. |
| 2018/0139686 A1* | 5/2018 | Kalhan ............... H04R 5/033 |
| 2019/0065354 A1* | 2/2019 | Jakov ................. G06F 16/95 |

OTHER PUBLICATIONS

U.S. Appl. No. 15/482,638, filed Apr. 7, 2017, Venkiteswaran, et al.
"Google Plus Users", Google+Ripples, Oct. 31, 2011 [retrieved on Feb. 21, 2012 from Internet at http://www.googleplusers.com/google-ripples.html], 3 pages.

* cited by examiner

US 10,778,559 B2

FACILITATING SIMULATION OF NETWORK CONDITIONS IN A HYBRID APPLICATION ENVIRONMENT

PRIORITY DATA

This application claims priority of U.S. Provisional Application No. 62/409,239, entitled "Offline and Network Variance Simulations for Web and Webviews," by Venkiteswaran et al, filed on Oct. 17, 2016, which is incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to the simulation of network conditions. More specifically, this patent document discloses techniques for simulating network conditions to facilitate the testing of hybrid applications.

BACKGROUND

Automating testing of software under degraded network conditions has historically been a difficult problem. Typically, to test software, a tester models various network types (e.g., 4G vs 2G vs WiFi, for example), as well as variability (e.g., dead spots vs statically slow network). The process of testing software operating in a hybrid application environment is even more difficult. FIG. 1 shows an example of a hybrid application environment 100. A hybrid application environment 100 typically includes web browser 102 (e.g., Chrome, Internet Explorer, Safari) and native application code 104 (e.g. Cocoa, C#, Java, C/C++) implemented on a mobile device 106 (e.g. Android, IOS, Windows). The combination of the web browser and native application code may be referred to as a hybrid application. The web browser of a hybrid application may also be referred to as a webview.

When a network is degraded and/or disabled at the network level, it can be difficult to maintain connectivity to a testing harness that drives automation while testing the impacts of a degraded network. In addition, in many instances there may be multiple testing instances utilizing the same network controller. This means that network-level degradation of a network connection would affect all testing instances and as such may be unfeasible if different applications or tests are being executed concurrently.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
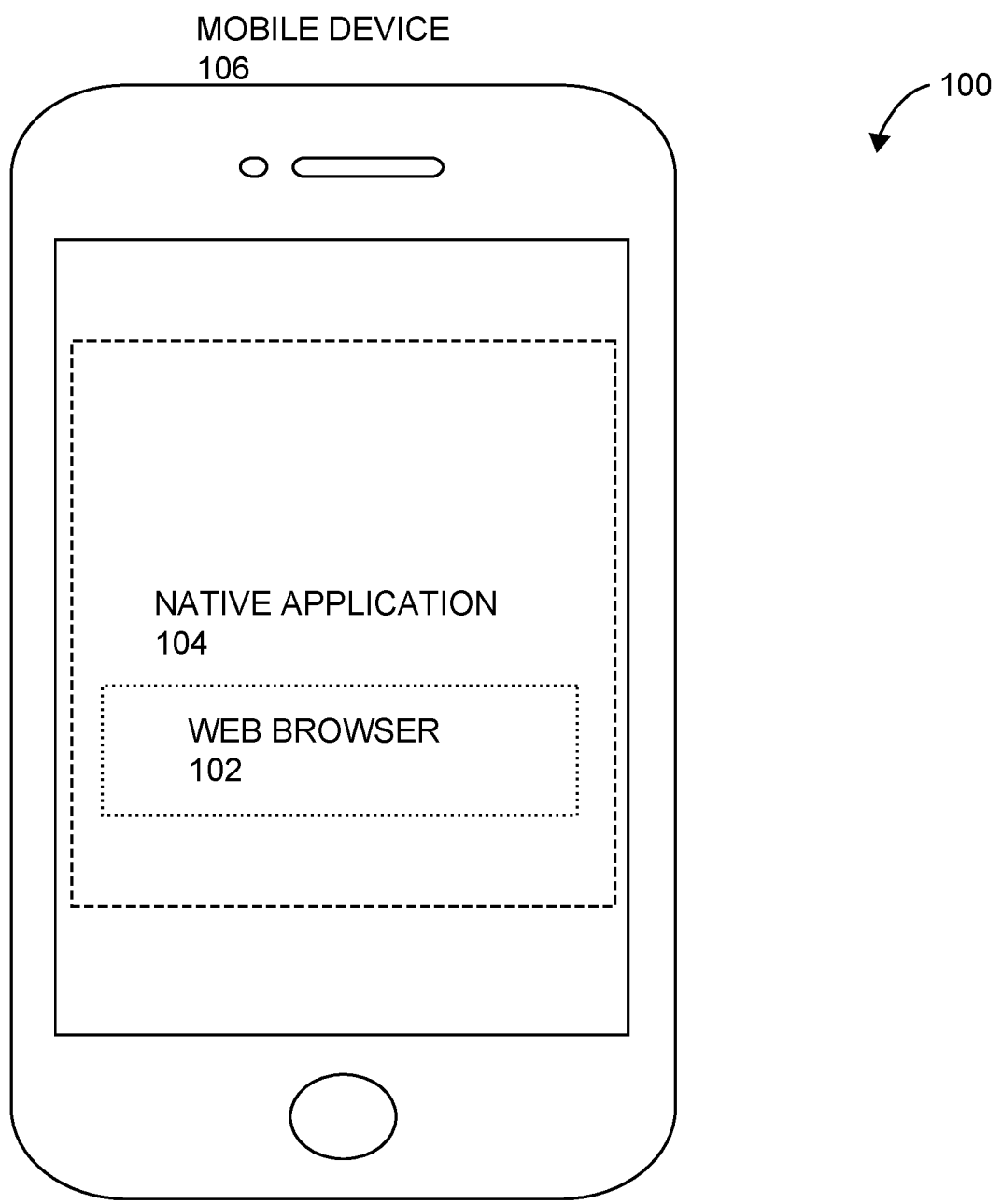
FIG. 1 shows an example of a hybrid application environment 100, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Various implementations described or referenced herein are directed to different methods, apparatus, systems, and computer program products for facilitating the simulation of network conditions to test the effect of those network conditions on an application operating in a hybrid application environment. A test system may intercept a network communication sent by a first computing device to a second computing device, where the test system is in communication with a web browser of a hybrid application executing on the second computing device. The test system transforms the network communication into a modulated network communication that simulates one or more network conditions. The test system then transmits the modulated network communication to the second computing device.

Since the test system is in communication with the web browser, the application (e.g., native code) may be tested without impacting the control channel. Since network conditions are simulated on a local level without degrading the network, testing may be accomplished under any simulated network condition without detrimentally impacting the connection via which network communications are transmitted. Furthermore, since the test system communicates directly with a web browser, native code of the hybrid application may be tested without impacting other applications or tests that may be executed concurrently.

By way of illustration, John is an employee at an organization, Pyramid Construction, Inc. John is responsible for testing the impact of various network conditions on hybrid applications. John may initiate the execution of a test script, which causes the transmission of network communications (e.g., packets) from an originating device to a computing device executing a hybrid application. For example, the network communications may be received from a web server in response to an HTTP request. A test system intercepts the network communications and transforms the network communications into modulated network communications to simulate one or more network conditions. For example, a network communication may be modulated to simulate a particular network speed, a network bandwidth, latency, and/or type of network. The modulated network communications may be transmitted to native code of the hybrid application, enabling the effect of the simulated network condition on the hybrid application to be observed without impacting the network.

In the following description, various terms have the following meanings. Other terms have meanings as commonly understood in the relevant arts:

"connection simulator library" in this context refers to a collection of logic to enable the simulation of different network conditions;

"modulated network communication" in this context refers to a network communication where the connection has been intentionally modified in some way (connectivity, speed, etc.);

"network communication API" in this context refers to a communication and control interface (such as a server API) to network elements such as a server;

"testing constraints" in this context refers to settings used during the course of a software test;

"network simulation filter" in this context refers to logic to modify a network communication to simulate a variety of network conditions; As will be described in further detail below, a system and method is disclosed to enable the modulation of network quality and connectivity to simulate a variety of network conditions. While standard practices may utilize a network layer modulation which would impact the testing harness and other applications on the network, this system and method enables the simulation of network conditions on an application level. This is achieved without requiring the modification of the hybrid application's native code (i.e., base code). Instead, the test system may be loaded into a web browser attached to or in communication with the application. For example, the test system may be loaded into a webview of a mobile application. The system may then intercept calls to and from the network stack instead of degrading the connection at the network layer. The system may accomplish this by overriding the server communication application programming interface (API) (e.g., XMLHttpRequest) and adjusting its callbacks and events based on the network model being simulated. This approach allows the system to:

1. Dynamically enable and disable network degradation testing without any OS-level intervention or escalated privileges. This allows a user to deploy this tool in continuous integration systems and external simulators (e.g. Saucelabs).
2. Integrate into hybrid apps without requiring any native code changes. The required logic is exclusively loaded into the webview which is served from an appserver.
3. Adjust behavior at a finer grained level, in a repeatable fashion, than is currently possible at the network layer.

Various aspects of this process may be performed using XHR (XMLHttpRequest), which is a browser request initiated from Javascript. The system may utilize XHR to simulate how the network would perform in different simulations.

By way of example, if there is a parent application in Objective C and it has a web browser (e.g., webview), then the web portion of the hybrid application may be loaded into the webview and modification of the network signal would occur at the web browser level. This approach allows the use of this system with legacy applications as well as new applications with minimal effort because there is no required modification of the application's code. This system allows the user to intercept the call to the server and modify the connection.

In some implementations, the system communicates with the browser via an API. The API may be browser specific, so the API may vary from browser to browser.

The system allows the user to utilize a testing station which is part of a larger network with a single network controller and modify or degrade the network connection for the individual testing station without impacting the network controller at the network layer so the other stations remain unaffected.

Figure 2:
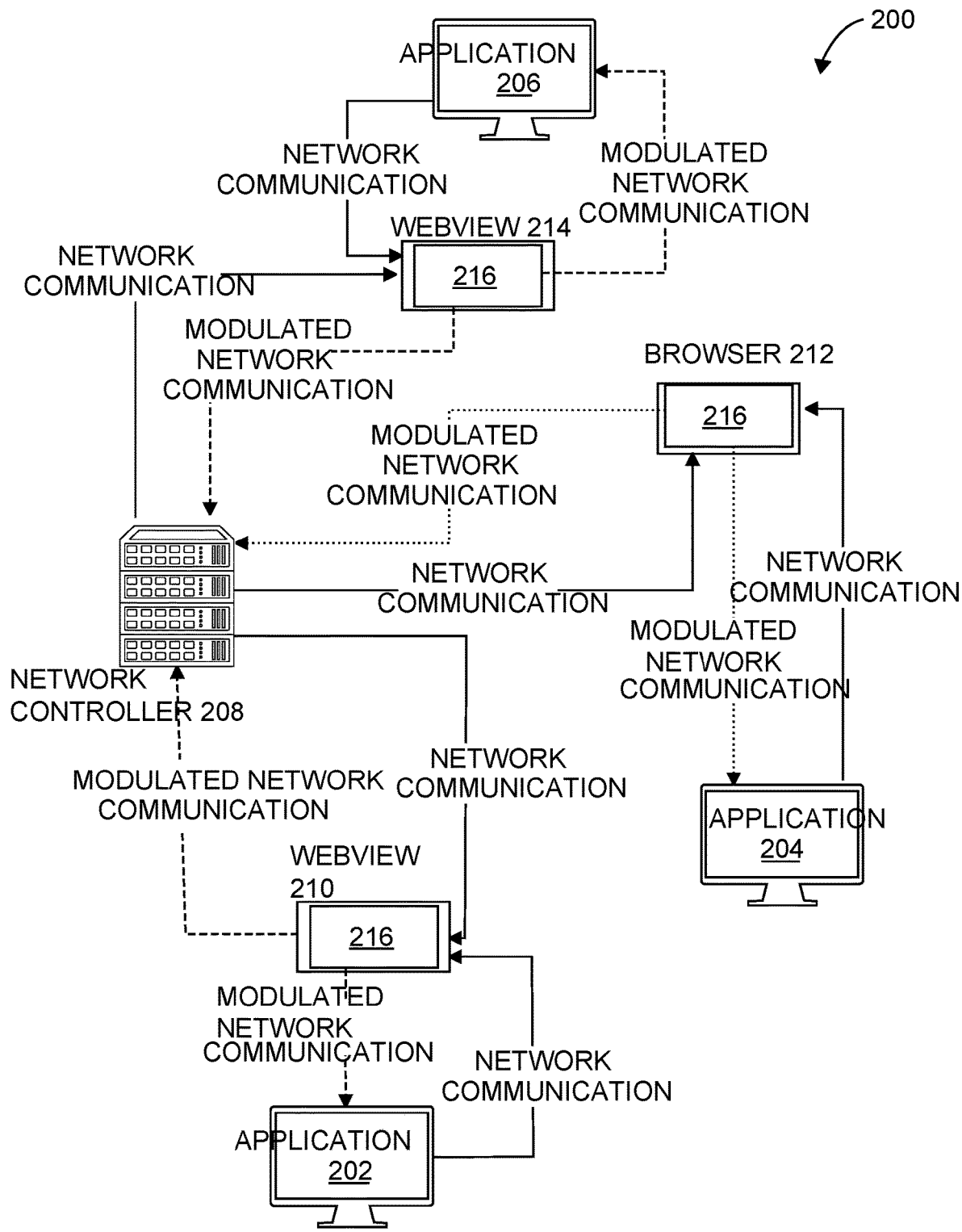
FIG. 2 shows an example of a network system 200, in accordance with some implementations.

FIG. 2 shows an example of a network system 200, in accordance with some implementations. Network system 200 comprises a test system 216, a webview 214, a browser 212, a webview 210, an application 202 (e.g., native code), an application 204, an application 206, and a network controller 208. Of course, other numbers of the various components may be present in other embodiments.

As shown in this example, the test system 216 may be utilized within the webview 214 (e.g., as used in hybrid apps in Cocoa, C#, Objective C, Android, etc), the browser 212 (e.g., Safari, IE, Chrome, Firefox), and the webview 210. The test system 216 allows the network controller 208 (e.g., Linux Server, Windows Network Controller, etc.) to remain unaffected by testing of the respective applications 206, 204, and 202. Each of the webview 214, the webview 210, and the web browser 212 receives and transmits the network communications to and from the network controller 208.

The test system 216 may intercept the network communications to the applications. Similarly, the test system 216 may intercept the network communications from the applications. After a network communication is intercepted, the test system 216 may override the network communication API (e.g., as provided by Apache HTTP Server, Microsoft IIS, Oracle iPlanet Web Server) to modulate the network communication according to testing constraints.

As shown in this example, the test system 216 may modulate a network communication from the application 202 to create a modulated network communication between the webview 210 and the network controller 208. Similarly, the test system 216 may modulate a network communication from the application 204 to create a modulated network communication to the network controller 208. The test system 216 may likewise modulate the network communications from the other applications such as application 206.

The test system 216 may similarly modulate network communications to the applications. For example, the test system 216 may intercept a network communication transmitted to a hybrid application and transform the network communication into a modulated network communication that is transmitted to the application (e.g., native code) being tested.

Figure 3:
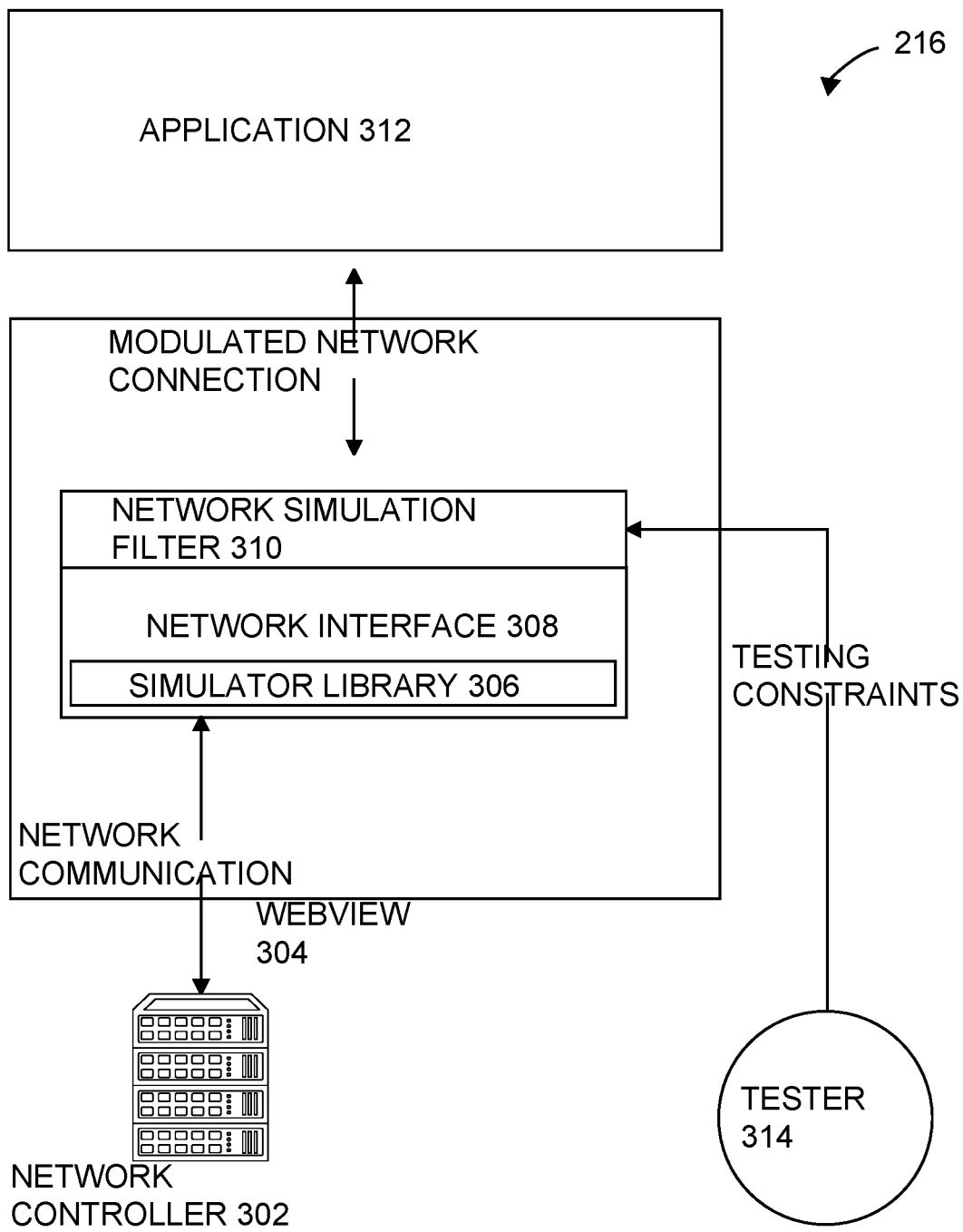
FIG. 3 shows an example of a test system 300 in accordance with some implementations.

FIG. 3 shows an example of a test system 300 in accordance with some implementations. FIG. 3 illustrates the operation of test system 216, which can facilitate the modulation of network communications transmitted to applications and/or from applications. In this example, the test system 216 includes a network controller 302, a webview 304, a connection simulator library 306, a network interface 308, a network simulation filter 310, an application 312, and a tester 314. Of course, other numbers of these components and other components unnecessary to this description may also be present.

In this example, the connection simulator library is illustrated as being integral with the test system. However, the connection simulator library may also be implemented external to the test system. For example, the connection simulator library may be implemented at a separate location from the location at which test system is implemented. As another example, the connection simulator library may be implemented by a different organization from the organization responsible for testing hybrid applications The network interface 308 receives a network communication from the network controller 302 and a software module of the test system 216 intercepts the network communication. The software module 216 may operate the connection simulator library 306 to override the network communication API. For example, the software module 216 may use XHR to apply the connection simulator library.

In some implementations, network simulation filter 310 may be applied to the network communication to access pertinent logic components of the connection simulator library 306 according to specific testing constraints. For example, the network simulation filter 310 may apply the testing constraints provided by the tester 314 (e.g. test harness) to transform the network communication into a modulated network communication. The modulated network communication is then transmitted to the application 312. The application 312 receives the modulated network communication and executes using the modulated network communication as input.

Figure 4:
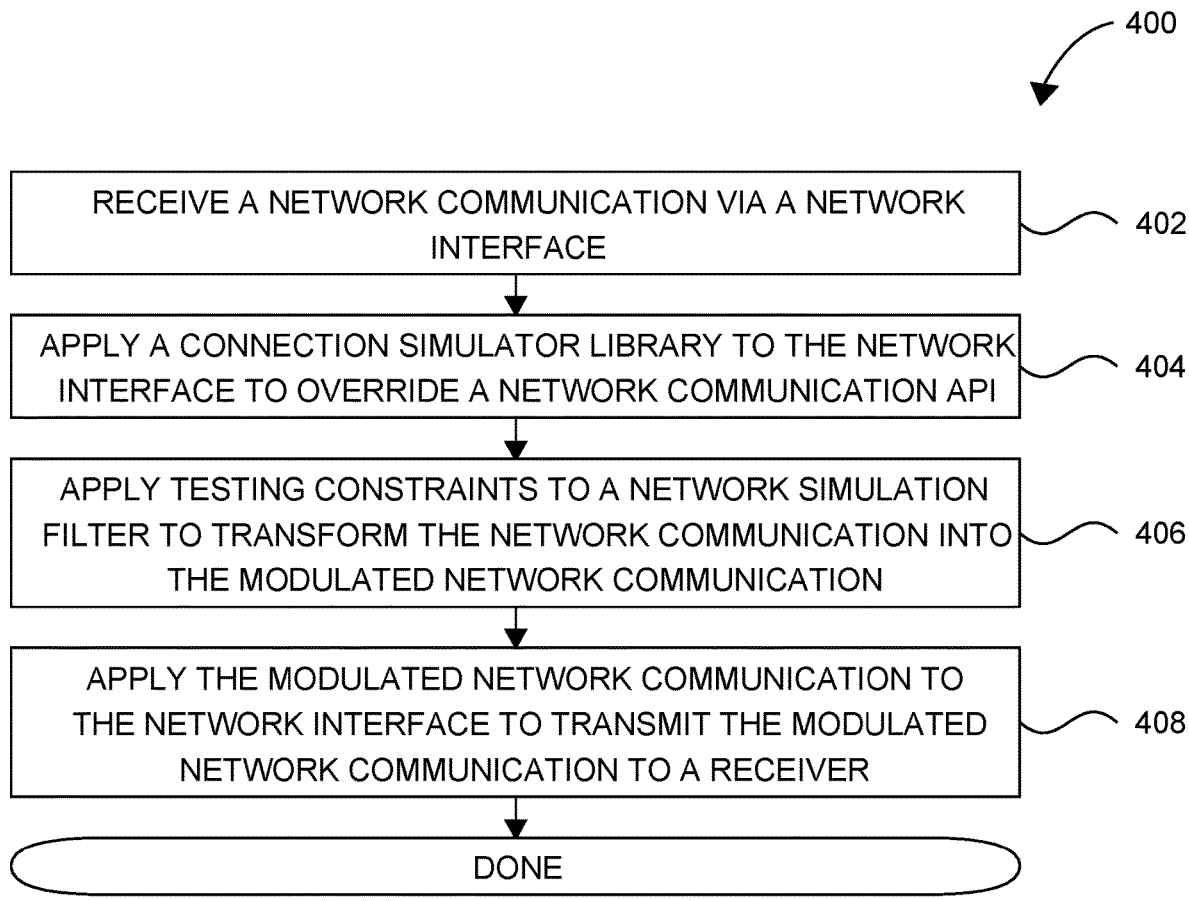
FIG. 4 shows a flowchart of an example of a method 400 for modulating network communications 400, in accordance with some implementations.

FIG. 4 shows a flowchart of an example of a method 400 for modulating network communications 400, in accordance with some implementations. As shown at block 402, a process for modulating network communications 400 receives a network communication via a network interface. The network communication can be transmitted by a computing device that is located at a separate location in the network. In some implementations, the testing process is performed according to a test script.

A connection simulator library may be applied to the network interface to override a network communication API (block 404). In some implementations, the connection simulator library may be applied using the XHR API, as will be described in further detail below.

In some implementations, a network simulation filter may transform the network communication into a modulated network communication. More particularly, the network simulation filter may apply testing constraints to transform the network communication into a modulated network communication (block 406) based upon information received in response to accessing the connection simulator library. In some implementations, the network communication may be modulated by a software module that has been loaded into a web browser (e.g., webview).

The modulated network communication may transmit the modulated network communication to a receiver (block 408). For example, the modulated network communication may be transmitted to the web browser/application being tested via an API of the web browser. In some implementations, the modulated network communication may be transmitted to the computing device on which the application is executing.

Figure 5:
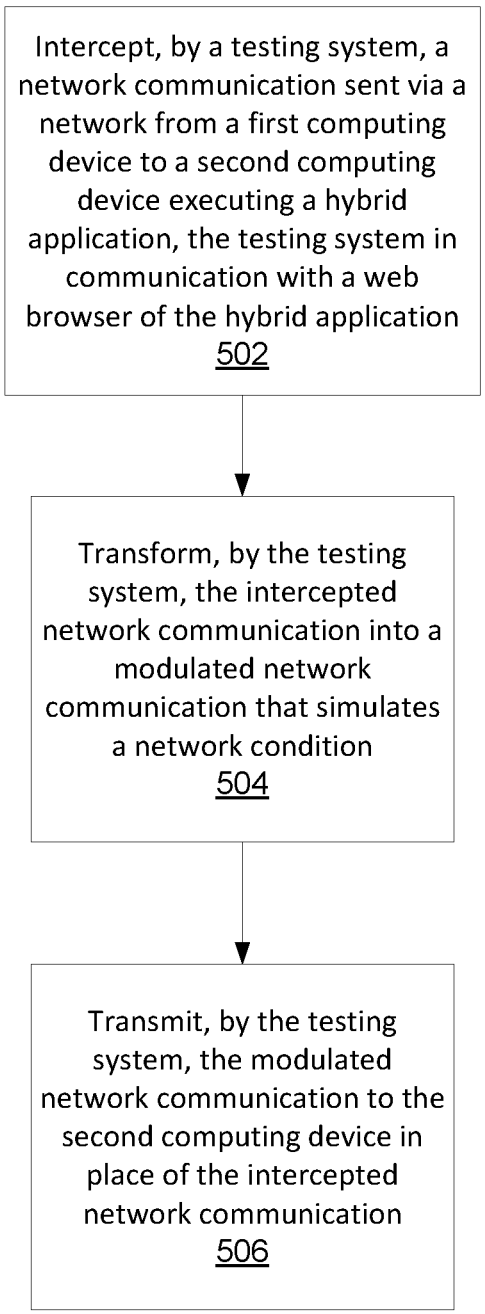
FIG. 5 shows a flowchart of an example of a method 500 for modulating network communications 500, in accordance with some implementations.

FIG. 5 shows a flowchart of an example of a method 500 for modulating network communications 500, in accordance with some implementations. A test system may receive or intercept a network communication sent via a network from a first computing device to a second computing device executing a hybrid application at 502, where the test system is in communication with a web browser. In some implementations, the network communication is a response received from a web server.

The test system may be injected between the first computing device and the web browser. More particularly, the test system may intercept communications received from the first computing device. For example, the test system may intercept communications (e.g., an HTTP response) received from a web server. In addition, the test system may intercept communications transmitted by the second computing device (e.g., web browser).

In some implementations, the test system or a portion thereof is integral with the second computing device. For example, the test system may include a software module or hardware component installed on the second computing device. In other implementations, the test system or software module of the test system may be loaded into the web browser. In other implementations, the test system may include a third computing device that is independent from the second computing device.

The test system may transform the network communication into a modulated network communication that simulates one or more network conditions at 504. For example, the network conditions may include a particular network type, a network speed, dead spot, etc.

Simulation of a network condition may be based, at least in part, on one or more characteristics of the network communication. For example, the size of the payload of the network communication may impact the response time of the modulated network communication.

A number of companies offer services that can be used to facilitate the testing of software applications. These services provide access to logic components that may be used to simulate a number of different network conditions and/or devices (e.g., mobile devices). Typically, each of the services may be accessed via a corresponding API. For example, a particular API may be called to simulate a network condition such as a particular network speed. As another example, another API may be called to simulate a particular device operating according to a particular network condition.

Since it is possible to simulate various types of devices, the test system may be implemented with or on any computing device. The test system may be used in conjunction with a mobile device on which a mobile application being tested is installed. Alternatively, the test system may be used to test a mobile application under various network conditions without installing the mobile application on a mobile device.

In accordance with various implementations, the test system is communicatively coupled to a connection simulator library that includes logic components (e.g., software modules) that represent various network conditions and/or devices. Thus, to simulate a particular network condition, the test system may apply a logic component representing the network condition and/or device.

In some implementations, the connection simulator library may be maintained by a computing device or system that is external to the second computing device. Logic components of the connection simulator library may be accessed via APIs. In some implementations, logic components of the connection simulator library may be accessed via a network simulation filter operating on the second network device and configured to apply various logic components according to a desired set of testing constraints. For example, the simulation filter may operate according to a test script that is executed locally or remotely. In some implementations, the test system is loaded into the web browser and the simulation library is applied within the web browser.

The test system may communicate with the web browser via an API of the web browser. Thus, the test system may be designed to interface with a particular web browser. Since the test system is independent from and external to the application (e.g., native code) being tested, the native code need not be modified to enable the native code to be tested under various network conditions. Moreover, since the test system is independent from and external to the web browser, the test system may be built and configured without modifying the web browser.

In accordance with various implementations, the test system transforms the network communication by overriding a network connection API. Typically, the web browser uses the XmlHttpRequest (XHR) API for all network communication. XHR provides client functionality for transferring data between the client (e.g., web browser) and a server (e.g., web server). Since the test system intercepts the network communications, it may use XHR such that it overrides the web browser-provided implementation. This enables the test system to vary the behavior of the API according to various simulated network conditions.

In some implementations, the test system may apply the connection simulator library using XHR. After receiving a response from a web server, the test system may determine characteristics of the response. For example, the test system may determine the size (e.g., number of bytes) of the payload of the response. The test system may then access a logic component of the connection simulator library according to the characteristics of the response and/or testing constraints (e.g., network condition and/or device type) indicating the network condition and/or device being simulated. For example, the test system may identify the appropriate logic component to access and call an API corresponding to the logic component with parameters indicating characteristics of the response and/or testing constraints. In response, the test system may receive information indicating the conditions (e.g., time delay and/or packet modifications) under which to transmit the response to the client. The test system may then modulate the response according to the information it has received from the logic component.

The test system may use various functions and mechanisms to enable the test system to override the browser-provided implementation of the network connection API.

For example, the test system may capture state of the application under test and vary the network modulation from that state.

The test system may transmit the modulated network communication to the second computing device in place of the received or intercepted network communication at 506. In some implementations, the test system may be configured to communicate with the web browser via one or more APIs of the web browser. More particularly, the test system may transmit the modulated network communication directly to the web browser via an API of the web browser without transmitting the modulated network communication over the network. Since the modulated network communication need not be transmitted over the network, the network condition may be simulated without impacting other computing devices or network controllers on the network.

The effect of a particular network condition on the operation of a hybrid application may be ascertained via various mechanisms. The tester may observe the operation of the hybrid application on the second computing device. Alternatively, the results of the execution of the hybrid application under the particular network condition may be captured at the second computing device or transmitted to another computing device (e.g., the first computing device or a third computing device). For example, a test script may instruct the web browser to save or transmit results of execution of the hybrid application.

In some implementations, network communications transmitted to the second computing device are modulated without modulating further network communications transmitted from the second computing device. In other implementations, network communications that are transmitted both to the second computing device (e.g., to the application being tested) and from the second computing device (e.g., from the application being tested) are modulated.

In accordance with various implementations, the test system may intercept a second network communication sent from the second computing device executing the hybrid application. The test system may transform the second intercepted network communication into a second modulated network communication, where the second modulated network communication simulates the effect of the network condition on the second network communication. The second modulated network communication may be transmitted in place of the second intercepted network communication over the network to either the first computing device or a third computing device.

Figure 6:
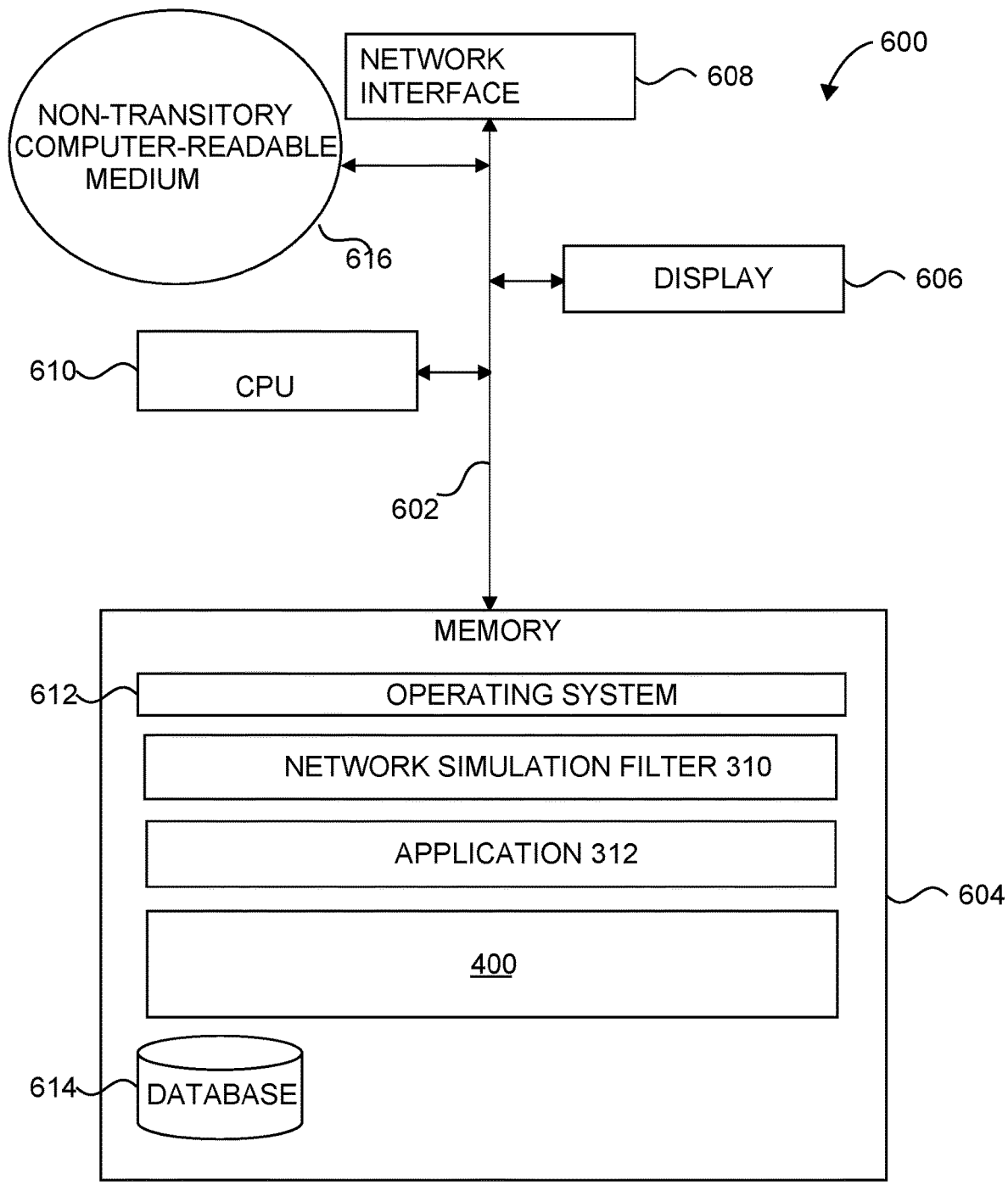
FIG. 6 shows an example of a system 600, in accordance with some implementations.

FIG. 6 illustrates several components of an example system 600 in accordance with one implementation. In various implementations, system 600 may include a desktop PC, server, workstation, mobile phone, laptop, tablet, set-top box, appliance, or other computing device that is capable of performing operations such as those described herein. In some s, system 600 may include many more components than those shown in FIG. 6. However, it is not necessary that all of these generally conventional components be shown in order to disclose an illustrative implementation. Collectively, the various tangible components or a subset of the tangible components may be referred to herein as "logic" configured or adapted in a particular way, for example as logic configured or adapted with particular software or firmware.

In various implementations, system 600 may comprise one or more physical and/or logical devices that collectively provide the functionalities described herein. In some implementations, system 600 may comprise one or more replicated and/or distributed physical or logical devices.

In some implementations, system 600 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 600 may include a bus 602 interconnecting several components including a network interface 608, a display 606, a central processing unit 610, and a memory 604. Memory 604 generally comprises a random access memory ("RAM") and permanent non-transitory mass storage device, such as a hard disk drive or solid-state drive. Memory 604 stores an operating system 612.

These and other software components may be loaded into memory 504 of system 600 using a drive mechanism (not shown) associated with a non-transitory computer-readable medium 616, such as a floppy disc, tape, DVD/CD-ROM drive, memory card, or the like.

In this example, memory 604 includes database 614. In some implementations, system 600 may communicate with database 614 via network interface 608, a storage area network ("SAN"), a high-speed serial bus, and/or via the other suitable communication technology. In some implementations, database 614 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

"Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation. Those having skill in the art will appreciate that there are various logic implementations by which processes and/or systems described herein can be effected (e.g., hardware, software, and/or firmware), and that the preferred vehicle will vary with the context in which the processes are deployed.

"Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware.

The foregoing detailed description has set forth various implementations of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the implementations disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Various implementations described or referenced herein are directed to different methods, apparatus, systems, and computer program products for facilitating the testing of applications in a hybrid application environment. Some but not all of the techniques described or referenced herein are implemented using or in conjunction with a customer relationship management (CRM) system or other database management system. CRM systems have become a popular way to manage and analyze customer interactions and data throughout the business lifecycle. Salesforce.com, Inc. is a provider of CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud.

Some CRM systems can be implemented in various settings, including organizations. For instance, a CRM system can be implemented to provide database access to users within an enterprise such as a company or business partnership, or a group of users within such an organization. For instance, employee users in a division of a business organization may share data with users in another division of the business organization. In the example of a multi-tenant database system, each organization or group within the organization can be a respective tenant of the system, as described in greater detail below. In some but not all implementations, the disclosed methods, apparatus, systems, and computer program products may be configured or designed for use in a multi-tenant database environment.

The term "multi-tenant database system" generally refers to those systems in which various elements of hardware and/or software of a database system may be shared by one or more customers. For example, a given application server may simultaneously process requests for a great number of customers, and a given database table may store rows of data such as customer sales data for a potentially much greater number of customers.

Where there are multiple tenants, a user is typically associated with a particular tenant. For example, a user could be a salesperson of a company, which is a tenant of the database system that provides a database service.

In some implementations, data objects in the form of CRM records such as cases, accounts, or opportunities are stored in a database system. Updates to a record may include any change to a record. Examples of record updates include field changes in the record, updates to the status of a record, as well as the creation or deletion of the record itself.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get.

In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Figure 7A:
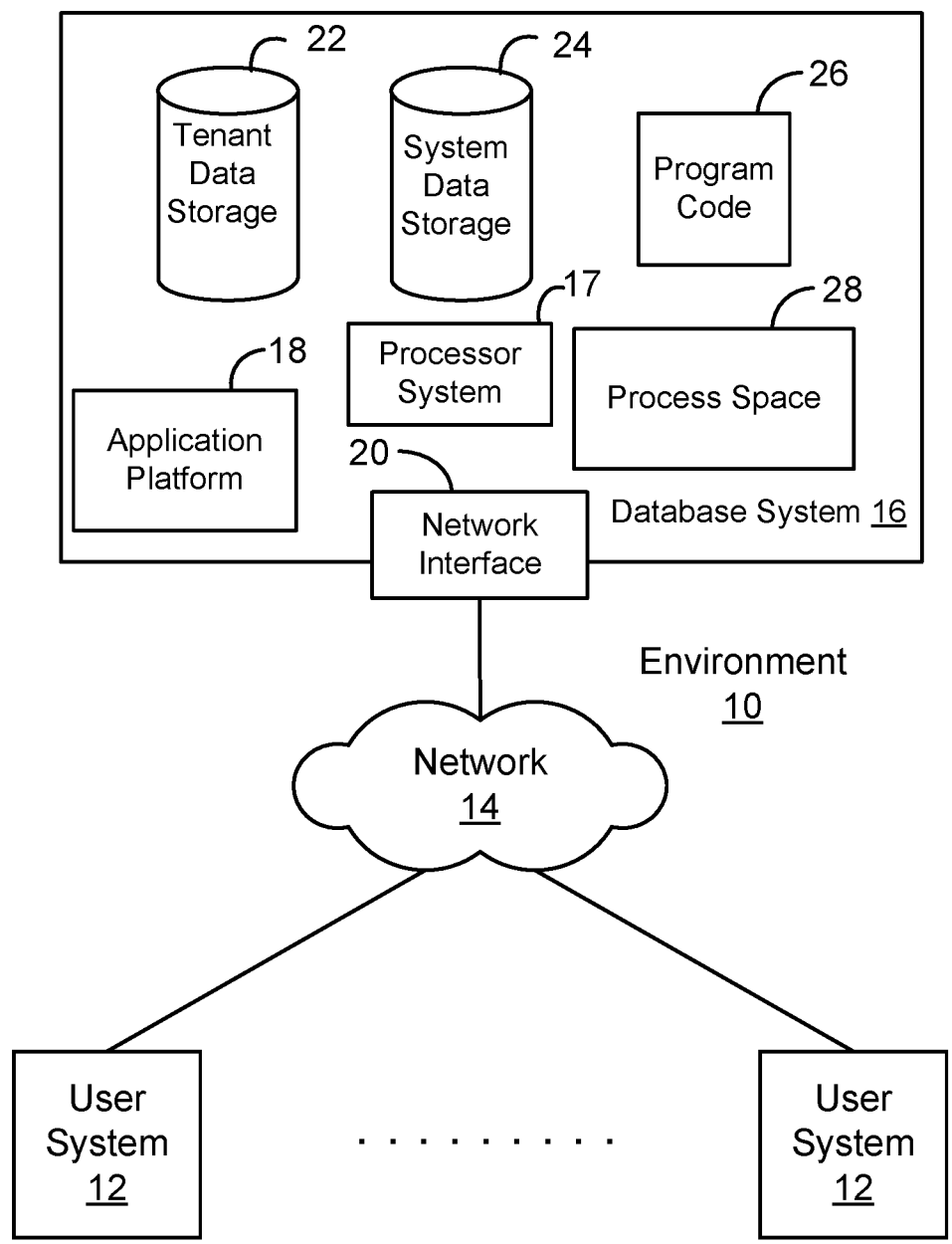
FIG. 7A shows a block diagram of an example of an environment 10 in which an on-demand database service can be used in accordance with some implementations.

FIG. 7A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 7A (and in more detail in FIG. 7B) user systems 12 might interact via a network 14 with an on-demand database service, which is implemented in the example of FIG. 7A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creating, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 7A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation of applications, storage of the applications into one or more database objects and executing of the applications in a virtual machine in the process space of the system 16.

Figure 7B:
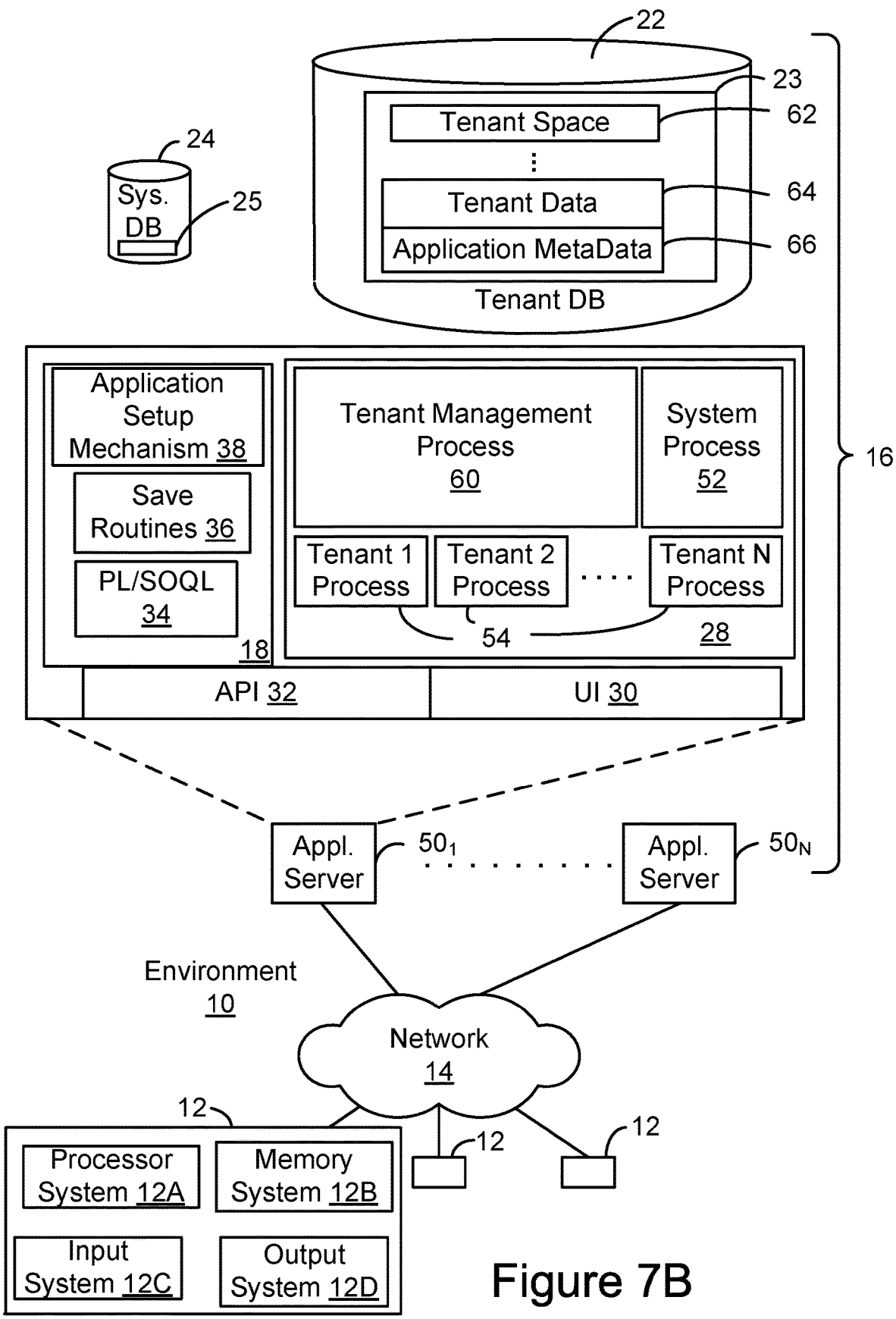
FIG. 7B shows a block diagram of an example of some implementations of elements of FIG. 7A and various possible interconnections between these elements.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 7A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer." User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 7B shows a block diagram of an example of some implementations of elements of FIG. 7A and various possible interconnections between these elements. That is, FIG. 7B also illustrates environment 10. However, in FIG. 7B elements of system 16 and various interconnections in some implementations are further illustrated. FIG. 7B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 7A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 7B, system 16 may include a network interface 20 (of FIG. 7A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc. can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and/or update system-level or tenant-level data from system 16, which may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data (e.g., data item) for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 8A:
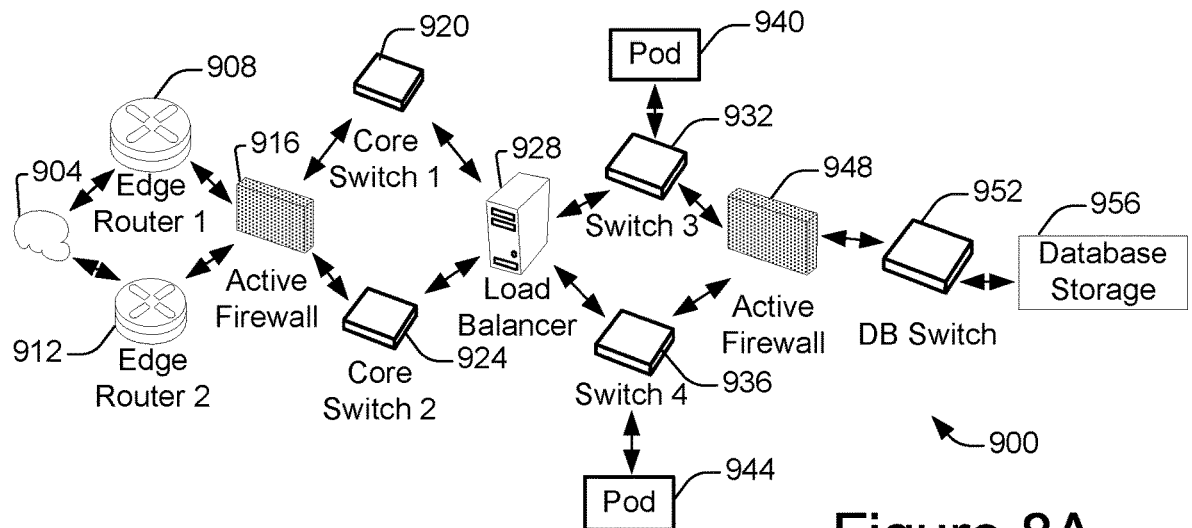
FIG. 8A shows a system diagram of an example of architectural components of an on-demand database service environment 900, in accordance with some implementations.

FIG. 8A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in Figures A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 8B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIG. 8B.

Figure 8B:
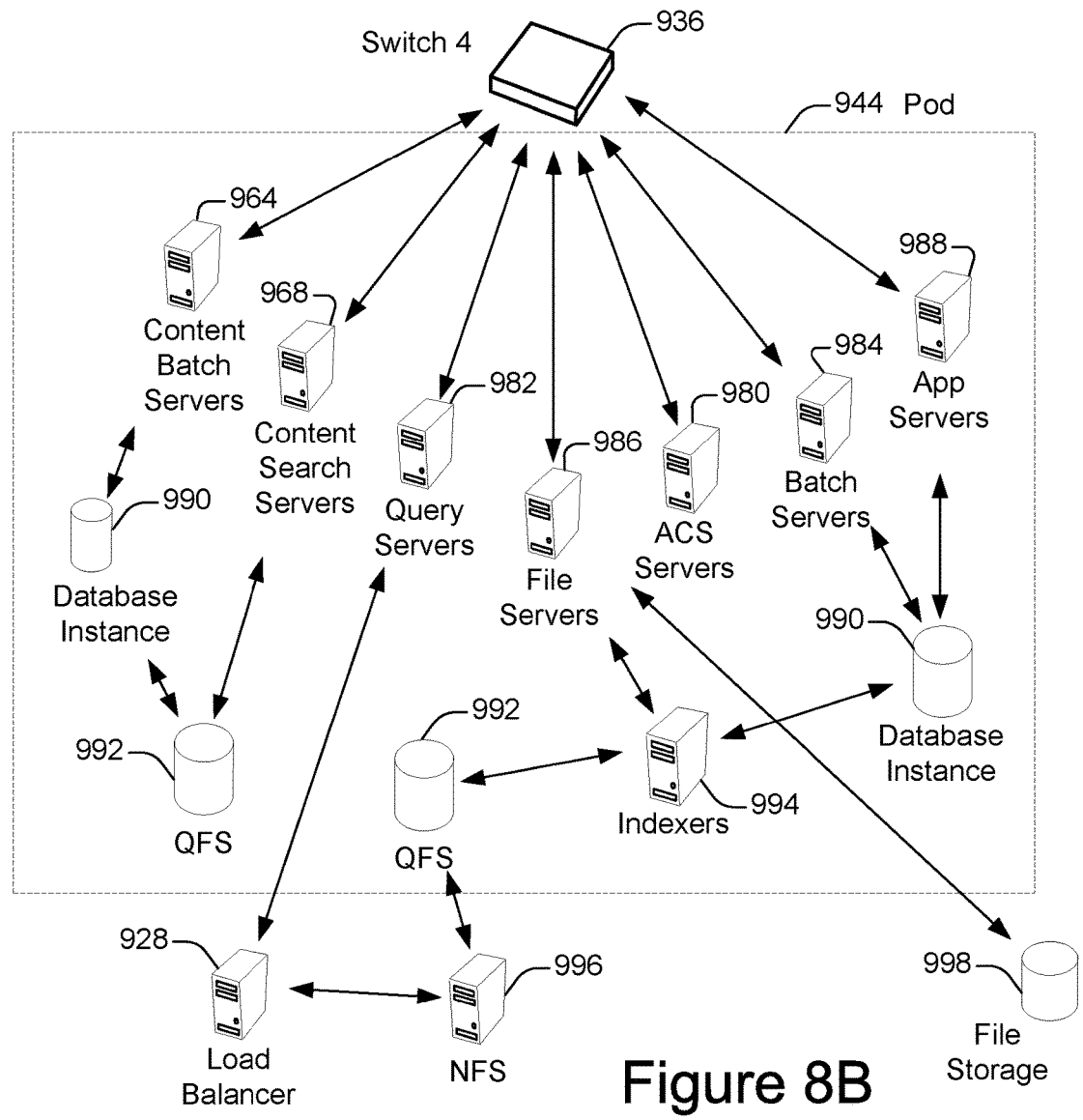
FIG. 8B shows a system diagram further illustrating an example of architectural components of an on-demand database service environment, in accordance with some implementations.

FIG. 8B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 8A and 8B include a hardware and/or software framework configurable to execute procedures using programs, routines, scripts, etc. Thus, in some implementations, one or more of application servers $50_1$-$50_N$ of FIG. 7B can be configured to initiate performance of one or more of the operations described above with reference to FIGS. 4-5 by instructing another computing device to perform an operation. In some implementations, one or more application servers $50_1$-$50_N$ carry out, either partially or entirely, one or more of the disclosed operations described with reference to FIGS. 4-5. In some implementations, app servers 988 of FIG. 8B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
    a test system implemented using a network device, the test system configurable to cause:
        intercepting a network communication sent via a network from a first computing device to a second computing device executing a hybrid application, the test system in communication with a web browser of the second computing device, the hybrid application including a native code portion and a web application portion, wherein the test system is integral with the second computing device;

determining one or more characteristics of the network communication, the characteristics including a size of a payload of the network communication;

capturing a state of the hybrid application;

transforming the intercepted network communication into a modulated network communication that simulates an effect of a network condition on the hybrid application, wherein transforming the intercepted network communication includes overriding a network communication application programming interface (API) by applying a simulator library based, at least in part, on the characteristics of the network communication and the state of the hybrid application; and transmitting the modulated network communication to the web browser of the second computing device in place of the intercepted network communication without transmitting the modulated network communication via the network.

2. The system as recited in claim 1, the test system further configurable to cause:

loading test logic of the test system into the web browser.

3. The system as recited in claim 1, wherein the first computing device comprises a web server.

4. The system as recited in claim 1, wherein transforming the intercepted network communication into a modulated network communication comprises:

applying a logic component of the simulator library using XML HTTP Request (XHR).

5. The system as recited in claim 1, the test system further configurable to cause:

intercepting a second network communication sent from the second computing device executing the hybrid application;

transforming, the second intercepted network communication into a second modulated network communication, wherein the second modulated network communication simulates the effect of the network condition on the second network communication; and transmitting the second modulated network communication to the web browser in place of the second intercepted network communication.

6. The system as recited in claim 1, wherein transmitting the modulated network communication to the second computing device in place of the intercepted network communication comprises:

calling an application programming interface (API) of the web browser.

7. A computer program product comprising computer-readable program code capable of being executed by one or more processors when retrieved from a non-transitory computer-readable medium, the program code comprising instructions configurable to cause:

intercepting a network communication sent via a network from a first computing device to a second computing device executing a hybrid application, the test system in communication with a web browser of the second computing device, the hybrid application including a native code portion and a web application portion, wherein the test system is integral with the second computing device;

determining one or more characteristics of the network communication, the characteristics including a size of a payload of the network communication;

capturing a state of the hybrid application;

transforming the intercepted network communication into a modulated network communication that simulates an effect of a network condition on the hybrid application, wherein transforming the intercepted network communication includes overriding a network communication application programming interface (API) by applying a simulator library based, at least in part, on the characteristics of the network communication and the state of the hybrid application; and transmitting the modulated network communication to the web browser of the second computing device in place of the intercepted network communication without transmitting the modulated network communication via the network.

8. The computer program product as recited in claim 7, the program code comprising instructions further configured to cause:

loading test logic of the test system into the web browser.

9. The computer program product as recited in claim 7, wherein the first computing device comprises a web server.

10. The computer program product as recited in claim 7, wherein transforming the intercepted network communication into a modulated network communication comprises:

applying a logic component of the simulator library using XML HTTP Request (XHR).

11. The computer program product as recited in claim 7, the program code comprising instructions further configured to cause:

intercepting a second network communication sent from the second computing device executing the hybrid application;

transforming the second intercepted network communication into a second modulated network communication, wherein the second modulated network communication simulates the effect of the network condition on the second network communication; and transmitting the second modulated network communication to the web browser in place of the second intercepted network communication.

12. The computer program product as recited in claim 7, wherein transmitting the modulated network communication to the second computing device in place of the intercepted network communication comprises:

calling an application programming interface (API) of the web browser.

13. A method for simulating the effect of a network condition on a hybrid application, comprising:

intercepting, by a test system, a network communication sent via a network from a first computing device to a second computing device executing the hybrid application, the test system in communication with a web browser of the second computing device, the hybrid application including a native code portion and a web application portion, wherein the test system is integral with the second computing device;

determining one or more characteristics of the network communication, the characteristics including a size of a payload of the network communication;

capturing a state of the hybrid application;

transforming, by the test system, the intercepted network communication into a modulated network communication that simulates the effect of the network condition on the hybrid application, wherein transforming the intercepted network communication includes overriding a network communication application programming interface (API) by applying a simulator library based, at least in part, on the characteristics of the network communication and the state of the hybrid application; and transmitting, by the test system, the modulated network communication to the web browser of the second computing device in place of the intercepted network communication without transmitting the modulated network communication via the network.

14. The method as recited in claim 13, further comprising: loading test logic of the test system into the web browser.

15. The method as recited in claim 13, wherein the first computing device comprises a web server.

16. The method as recited in claim 13, wherein transforming the intercepted network communication into a modulated network communication comprises:
   applying a logic component of the simulator library using XML HTTP Request (XHR).

17. The method as recited in claim 13, further comprising:
   intercepting, by the test system, a second network communication sent from the second computing device executing the hybrid application;
   transforming, by the test system, the second intercepted network communication into a second modulated network communication, wherein the second modulated network communication simulates the effect of the network condition on the second network communication; and
   transmitting, by the test system, the second modulated network communication to the web browser in place of the second intercepted network communication.

18. The method as recited in claim 13, wherein transmitting the modulated network communication to the second computing device in place of the intercepted network communication comprises:
   calling an application programming interface (API) of the web browser.

* * * * *